(12) United States Patent
Comstock (10) Patent No.: US 11,871,289 B2
(45) Date of Patent: *Jan. 9, 2024

(54) SYSTEMS AND METHODS FOR SMALL CELL UPLINK INTERFERENCE MITIGATION

(71) Applicant: Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,304

(22) Filed: Aug. 9, 2022

(65) Prior Publication Data
US 2022/0386205 A1    Dec. 1, 2022

Related U.S. Application Data

(63) Continuation of application No. 15/484,447, filed on Apr. 11, 2017, now Pat. No. 11,452,018, which is a
(Continued)

(51) Int. Cl.
*H04W 36/08*  (2009.01)
*H04W 36/32*  (2009.01)
(Continued)

(52) U.S. Cl.
CPC ........... *H04W 36/20* (2013.01); *H04W 16/14* (2013.01); *H04W 16/32* (2013.01); *H04W 28/04* (2013.01);
(Continued)

(58) Field of Classification Search
USPC ....................................................... 370/331
See application file for complete search history.

(56) References Cited

U.S. PATENT DOCUMENTS 7,801,542 B1   9/2010 Stewart
8,107,885 B2   1/2012 Love et al.
(Continued)

FOREIGN PATENT DOCUMENTS

EP   1 973 366 A2   9/2008
JP   2010-517492 A   5/2010
(Continued)

OTHER PUBLICATIONS

Huawei, Hisilicon; "Random Access Enhancement for HetNet"; R2-112005; 3GPP TSG-Ran WG2 Meeting #73bis, Shanghai, CN; Apr. 11-15, 2011; Internet <URL:http://www.3gpp.org/ftp/tsg-2005.ZIP>, Apr. 3, 2011, pp. 1-2.
(Continued)

*Primary Examiner* — Jeffrey M Rutkowski
*Assistant Examiner* — Luna Weissberger (57) ABSTRACT

Systems and methods for facilitating the mitigation of interference in the uplink of a small cell caused by macrocell user equipment in the case where the macrocell cannot identify the interfering macrocell user equipment because the user equipment cannot detect and report the small cell's downlink due to the small cell's uplink/downlink coverage imbalance. In an embodiment, the small cell provides the macrocell with a notification of the interference, the configuration information about its Physical Random Access Channel (PRACH), and a plurality of unique preambles and transmission times for non-contention-based transmissions on the small cell's PRACH. The macrocell orders each of one or a plurality of macrocell user equipment to transmit one of the unique preambles on the small cell's PRACH. The small cell reports to the macrocell the detected preamble transmissions, which allows the macrocell to identify interfering user equipment and perform corrective actions.

7 Claims, 5 Drawing Sheets

Related U.S. Application Data continuation of application No. 14/346,439, filed as application No. PCT/US2012/057822 on Sep. 28, 2012, now Pat. No. 9,642,058.

(60) Provisional application No. 61/542,043, filed on Sep. 30, 2011.

(51) Int. Cl.
*H04W 92/20* (2009.01)
*H04W 88/02* (2009.01)
*H04W 88/08* (2009.01)
*H04W 36/20* (2009.01)
*H04W 16/14* (2009.01)
*H04W 28/04* (2009.01)
*H04W 16/32* (2009.01)

(52) U.S. Cl.
CPC ........... *H04W 36/08* (2013.01); *H04W 36/32* (2013.01); *H04W 88/02* (2013.01); *H04W 88/08* (2013.01); *H04W 92/20* (2013.01)

(56) References Cited

U.S. PATENT DOCUMENTS

| | | | |
|---|---|---|---|
| 8,189,533 B2 * | 5/2012 | Muller | H04W 56/004 370/332 |
| 8,274,947 B1 * | 9/2012 | Fang | H04W 24/02 455/517 |
| 8,625,480 B2 | 1/2014 | Sun et al. | |
| 8,676,201 B2 | 3/2014 | Kazmi et al. | |
| 8,743,748 B2 | 6/2014 | Pan et al. | |
| 8,958,387 B2 | 2/2015 | Iwasaki | |
| 9,008,707 B2 | 4/2015 | Nilsson et al. | |
| 9,173,175 B2 | 10/2015 | Itoh et al. | |
| 2001/0044311 A1 | 11/2001 | Larsson et al. | |
| 2002/0193135 A1 | 12/2002 | Nakano | |
| 2005/0267677 A1 | 12/2005 | Poykko et al. | |
| 2007/0189205 A1 | 8/2007 | Terry et al. | |
| 2007/0298802 A1 | 12/2007 | Kaminski | |
| 2008/0161013 A1 | 7/2008 | Friman | |
| 2008/0188260 A1 | 8/2008 | Xiao et al. | |
| 2008/0267127 A1 | 10/2008 | Narasimha et al. | |
| 2009/0092097 A1 | 4/2009 | Nylander et al. | |
| 2009/0215459 A1 | 8/2009 | Kuo | |
| 2009/0247170 A1 | 10/2009 | Balasubramanian et al. | |
| 2010/0069084 A1 | 3/2010 | Parkvall et al. | |
| 2010/0074130 A1 | 3/2010 | Bertrand et al. | |
| 2010/0085929 A1 | 4/2010 | Harada et al. | |
| 2010/0197306 A1 | 8/2010 | Lopes | |
| 2010/0216479 A1 | 8/2010 | Kato et al. | |
| 2010/0216488 A1 | 8/2010 | Markoulidakis | |
| 2010/0232318 A1 | 9/2010 | Sarkar | |
| 2010/0238872 A1 | 9/2010 | Kim et al. | |
| 2010/0273500 A1 | 10/2010 | Romero et al. | |
| 2010/0303039 A1 | 12/2010 | Zhang et al. | |
| 2010/0304753 A1 | 12/2010 | Furuya | |
| 2010/0309877 A1 | 12/2010 | Damnjanovic et al. | |
| 2011/0007719 A1 | 1/2011 | Lee et al. | |
| 2011/0009129 A1 | 1/2011 | Lim et al. | |
| 2011/0039499 A1 | 2/2011 | Zhang et al. | |
| 2011/0080896 A1 | 4/2011 | Krishnamurthy et al. | |
| 2011/0111783 A1 | 5/2011 | Chayat | |
| 2011/0134868 A1 | 6/2011 | Lee et al. | |
| 2011/0171949 A1 | 7/2011 | Liao et al. | |
| 2011/0200032 A1 | 8/2011 | Indstrom et al. | |
| 2011/0201277 A1 | 8/2011 | Eguchi | |
| 2011/0237265 A1 | 9/2011 | Sugawara et al. | |
| 2011/0244899 A1 | 10/2011 | Li et al. | |
| 2011/0274040 A1 | 11/2011 | Pani et al. | |
| 2011/0280212 A1 | 11/2011 | Lv | |
| 2011/0281600 A1 | 11/2011 | Tanaka | |
| 2011/0294514 A1 | 12/2011 | Kulkarni | |
| 2012/0015659 A1 | 1/2012 | Kalyani et al. | |
| 2012/0021788 A1 | 1/2012 | Yavuz et al. | |
| 2012/0063302 A1 | 3/2012 | Damnjanovic et al. | |
| 2012/0071200 A1 | 3/2012 | Bienas et al. | |
| 2012/0149428 A1 | 6/2012 | Yang | |
| 2012/0178482 A1 | 7/2012 | Seo et al. | |
| 2012/0213089 A1 | 8/2012 | Shi et al. | |
| 2012/0257513 A1 | 10/2012 | Yamada | |
| 2012/0257601 A1 | 10/2012 | Kim et al. | |
| 2012/0275394 A1 | 11/2012 | Gunnarsson et al. | |
| 2012/0282889 A1 | 11/2012 | Tanaka et al. | |
| 2012/0289178 A1 | 11/2012 | Matsumura et al. | |
| 2012/0300715 A1 | 11/2012 | Pelletier et al. | |
| 2012/0302240 A1 | 11/2012 | Tamaki et al. | |
| 2012/0315935 A1 | 12/2012 | Helmersson et al. | |
| 2013/0010619 A1 | 1/2013 | Fong et al. | |
| 2013/0010711 A1 | 1/2013 | Larsson et al. | |
| 2013/0039195 A1 | 2/2013 | Weng et al. | |
| 2013/0040683 A1 | 2/2013 | Siomina et al. | |
| 2013/0058315 A1 | 3/2013 | Feuersanger et al. | |
| 2013/0070726 A1 | 3/2013 | Zhang et al. | |
| 2013/0084884 A1 | 4/2013 | Teyeb et al. | |
| 2013/0142268 A1 | 6/2013 | Gao et al. | |
| 2013/0210422 A1 | 8/2013 | Pani et al. | |
| 2013/0250925 A1 * | 9/2013 | Lohr | H04W 36/30 370/336 |
| 2013/0331115 A1 | 12/2013 | Falconetti et al. | |
| 2013/0337795 A1 | 12/2013 | Falconetti et al. | |
| 2014/0036714 A1 | 2/2014 | Teng et al. | |
| 2014/0044108 A1 | 2/2014 | Earnshaw et al. | |
| 2014/0064247 A1 | 3/2014 | Teyeb et al. | |
| 2014/0112254 A1 | 4/2014 | Lindoff et al. | |
| 2014/0119319 A1 | 5/2014 | Manssour | |
| 2014/0185595 A1 | 7/2014 | Wu et al. | |
| 2014/0198766 A1 | 7/2014 | Siomina et al. | |
| 2014/0233535 A1 | 8/2014 | Zhao et al. | |
| 2014/0321406 A1 | 10/2014 | Marinier et al. | |
| 2014/0328309 A1 | 11/2014 | Comstock | |

FOREIGN PATENT DOCUMENTS

| | | |
|---|---|---|
| JP | 2011-077964 A | 4/2011 |
| JP | 2012-044659 A | 3/2012 |
| WO | 2002/063329 A1 | 8/2002 |
| WO | 2009/055619 A1 | 4/2009 |
| WO | 2011/008875 A1 | 1/2011 |
| WO | 2011/049287 A2 | 4/2011 |
| WO | 2011/085200 A1 | 7/2011 |
| WO | 2012/061973 A1 | 5/2012 |

OTHER PUBLICATIONS

Kyocera Corporation; "Carrier-based HetNet ICIC", R3-112611; 3GPP TSG-RAN WG3 Meeting #73bis; Oct. 10-14, 2011; Zhuhai, CN.

Ericsson; "Scenarios selection for carrier based HetNet ICIC", R3-112053; 3GPP TSG-RAN WG3 Meeting #73; Athens, GR; Aug. 22-26, 2011.

New Postcom; "Discussions on TA grouping configuration and reconfiguration," R2-114120; 3GPP TSG-RAN WG2 Meeting #75; Athens, GR; Aug. 22-26, 2011.

* cited by examiner

SYSTEMS AND METHODS FOR SMALL CELL UPLINK INTERFERENCE MITIGATION

CLAIM OF PRIORITY

The present application is a continuation of and claims priority to U.S. application Ser. No. 15/484,447, entitled "SYSTEMS AND METHODS FOR SMALL CELL UPLINK INTERFERENCE MITIGATION", filed Apr. 11, 2017; which is a continuation of and claims priority to U.S. application Ser. No. 14/346,439, entitled "SYSTEMS AND METHODS FOR SMALL CELL UPLINK INTERFERENCE MITIGATION", filed Mar. 21, 2014; which is a national stage application of PCT/US2012/057822, entitled "SYSTEMS AND METHODS FOR SMALL CELL UPLINK INTERFERENCE MITIGATION," filed Sep. 28, 2012; which claims priority to U.S. Provisional Patent App. No. 61/542,043, filed Sep. 30, 2011, and titled "PICO CELL UPLINK INTERFERENCE MITIGATION"; all assigned to the assignee hereof and hereby expressly incorporated by reference in their entirety

FIELD OF THE INVENTION

The systems and methods disclosed herein relate generally to interference mitigation, and more particularly to mitigating interference caused by user equipment within the uplink range of a small cell, such as a pico cell.

BACKGROUND

Cellular or mobile networks are radio networks which may be distributed over a large geographical area. This geographical area is divided into "cells." Each cell is generally served by at least one transceiver known as a "base station," which is often fixed in location, and may comprise an evolved node B (eNB) on a Long Term Evolution (LTE) system. Together, the base stations may comprise a wireless wide area network ("VVWAN"). The VVWAN can also be communicatively coupled with a public or private network, which may include that particular aggregation of networks commonly known as the Internet.

The cellular network may comprise both "macrocells" and "small cells." A macrocell provides radio coverage served by a high power cellular base station, which typically has power outputs of tens of watts, and may be mounted on ground-based masts, rooftops, and other existing structures, at a height that provides a clear view over surrounding buildings and/or terrain. Small cells, on the other hand, are generally low-powered radio access nodes, encompassing, for instance, femtocells, picocells, and microcells. Whereas a macrocell may have a range of a few kilometers or more, small cells generally have ranges of less than a couple kilometers (e.g., in a rural setting), and frequently within the range of a couple hundred meters or less (e.g., 10 meters within an urban setting). Mobile operators often use small cells to extend their service coverage and/or increase network capacity, for example, by offloading traffic from macrocells to small cells during peak traffic times.

User equipment, which may be mobile and moving, is configured to establish connections with the base stations of the macrocells and small cells which form the cellular network. As used herein, the term "user equipment" (UE) may refer to any type of device, including, without limitation, a mobile station, such as a mobile communication device (e.g., smart phone or other wireless phone), tablet computer, and/or laptop computer, as well as a desktop computer. The connections formed between UEs and base stations may be established, for example, using code division multiple access ("CDMA"), Global System for Mobile Communications ("GSM"), Universal Mobile Telecommunication System ("UMTS"), LTE, or the like. Through these connections with the base stations, the UEs are able to establish voice and/or data communications with each other and other transceivers or receivers within the network or within other connected networks, including the Internet.

Small cells, such as femtocells, picocells, and microcells, may operate within the coverage area of large macrocells to form a heterogeneous network. Such a network can provide uniform broadband services across the entire coverage area of the macrocells. However, when the macrocell and small cells operate on the same radio carrier, co-channel interference between cells may cause a degradation in the performance of the cellular network. While operators may avoid such interference by allocating separate radio carriers to the macrocells and small cells, this can impact carrier utilization efficiency, and operators may be too limited in the amount of available spectrum to afford such an allocation.

A common technique to mitigate co-channel interference between UEs being served by a macrocell ("macrocell UE") and UEs being served by a small cell ("small-cell UE") is to allocate some of a carrier's sub-carriers for serving UEs that are nearer to the center of the macrocell and other sub-carriers for serving UEs that are nearer to the edge of the macrocell. The small-cell UEs are served using the sub-carriers allocated for the macrocell UEs nearer to the center of the macrocell. In some deployments, a small cell may also use the sub-carriers allocated for macrocell edge UEs, but the transmission power of the small cell UEs is restricted. Thus, the macrocell UEs nearer to the edge of the macrocell do not interfere with the small-cell UEs, and the macrocell UEs nearer to the center of the macrocell are separated by distance from the small-cell UEs. When a macrocell UE moves close to the edge of the macrocell and close to the small cell, measurement reports from the macrocell UE can trigger the macrocell to restrict the UE's resource assignments to those sub-carriers allocated for macrocell UEs nearer to the edge of the macrocell.

In a similar manner, operators may wish to deploy multiple carriers within the coverage areas of macrocells and small cells and dynamically control the use of these carriers in order to increase spectrum efficiency. Interference can be controlled by allocating a carrier or carriers for macrocell UEs nearer to the center of the macrocell and small-cell UEs, and allocating a different carrier for macrocell UEs nearer to the edge of the macrocell's coverage area and nearer to the small cell. When the macrocell UE moves close to the macrocell edge and close to the small cell, it can be handed over to the other macrocell carrier or to the small cell in order to avoid interference with the small cell.

Figure 1:
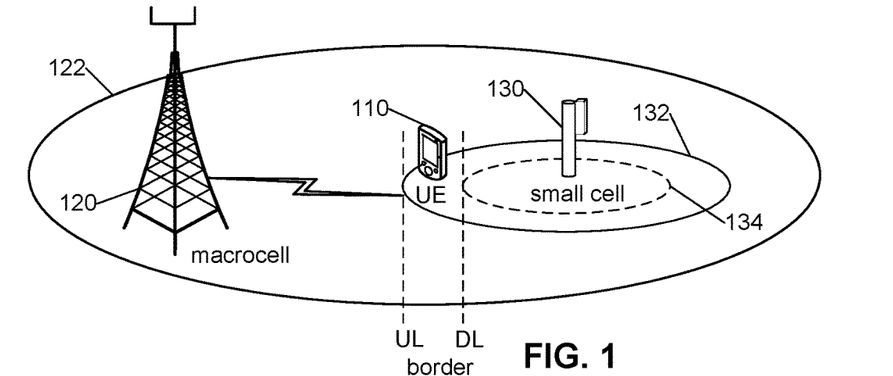
FIG. 1 illustrates a scenario in which a UE is causing interference on an uplink channel of a small cell.

However, FIG. 1 illustrates a scenario in which a UE being served by a macrocell may interfere with the operation of a small cell without normally triggering a handover. As shown, small cell 130 operates within the coverage area 122 of macrocell 120 and has unbalanced or asymmetrical uplink and downlink coverage. Specifically, uplink range 132 represents the area in which the small cell is able to receive an uplink signal from UE 110, and has greater coverage than downlink range 134, which represents the area in which the UE 110 is able to receive a downlink signal from small cell 130. While small cell 130 is shown as operating entirely within the range 122 of macrocell 120, it should be understood that the following description of an interference scenario applies to any instance in which at least a portion of the uplink range 132 of small cell 130 is within the coverage area 122 of macrocell 120.

Macrocell 120 and small cell 130 operate on one or more common radio carriers, such that UEs utilizing the macrocell, such as UE 110, and UEs utilizing the small cell 130 may experience co-channel interference. For example, in the scenario illustrated in FIG. 1, UE 110 is initially being served by macrocell 120, and is operating on at least one radio carrier frequency that small cell 130 may utilize for the UEs being served by small cell 130. UE 110 may have been assigned the common carrier either as a primary cell (PCell) or secondary cell (SCell). UE 110 is within the uplink coverage area of small cell 130, but is not within the downlink coverage area of small cell 130. In other words, the small cell 130 can receive uplink signals from the UE 110, but the UE 110 is unable to receive downlink signals from the small cell 130. Consequently, UE 110's uplink signal is interfering with small cell 130, but UE 110 is unable to detect small cell 130.

If the downlink and uplink signals were balanced, the downlink signal strength at UE 110 could trigger a measurement event of the UE 110. In the case without uplink-downlink imbalance, the UE 110 would measure the downlink signal strength of small cell 130. The UE 110 would then send the measurement information to macrocell 120. This transmission of measurement information would normally inform macrocell 120 about the potential interference at small cell 120 caused by UE 110. Based on the measurement information, macrocell 120 would determine what corrective action, if any, should be taken. For example, macrocell 120 may initiate a handover procedure to hand over UE 110 to be served by small cell 130, or to continue to be served by macrocell 120 but on a different radio carrier.

However, in the scenario illustrated in FIG. 1, the downlink signal strength from the small cell 130 is not strong enough at the UE 110 to trigger a measurement event of the UE 110. Thus, the macrocell 120 is unaware that the UE 110 is causing interference for small cell 130, and therefore, unable to mitigate the interference through corrective action, such as a handover. The small cell 130 could report the uplink interference to macrocell 120, for example, over a terrestrial connection between the two base stations, such as an X2 interface of the LTE standard. However, even if macrocell 120 is informed of the interference, it would be unable to take corrective action since the macrocell may be servicing multiple UEs, and the identity of the particular UE causing the interference is unknown to both macrocell 120 and small cell 130.

Accordingly, there is a need for mechanisms to control the use of radio carriers in the operation of a cellular network. The LTE specifications include several mechanisms to assist with controlling interference. UEs are capable of providing a serving base station with measurement reports of the downlink signal strength of neighbor cells. These have been commonly used in mobile systems to assist with handovers to other cells. For interference management, the measurement reporting capability has been expanded to allow a base station to determine whether the UE is operating within the central region of the cell or whether it is operating in the edge region of a cell and is near another cell. New triggers for downlink signal strength measurement reporting have been defined to help the macrocell determine when a UE is crossing the boundary between the central region and the cell edge region. However, these triggers are dependent on the UE detecting and measuring the downlink signal strength of a neighbor base station, and a common technique for controlling downlink interference from a small cell is to reduce the small cell's downlink transmission power, which is one illustration of how an imbalance can occur between the uplink and downlink coverage areas of the small cell, as illustrated in FIG. 1.

Another mechanism provided in the LTE specifications to assist with controlling interference is the uplink (UL) High Interference Indication (HII). This parameter may be used by a base station to notify other base stations about sub-carrier allocations being allocated for resource assignments for UEs near the edge of a cell. Base stations receiving this parameter should avoid assigning these resources to their served UEs, or should only assign these resources to UEs transmitting with lower power. Another LTE mechanism for interference control is the Uplink Interference Overload Indication (OI) parameter, which may be exchanged between base stations and provides uplink interference information about one of the sending base station's cells where the particular sub-carriers with uplink interference are identified for a particular carrier, the uplink interference measurements have been averaged over a time period, and the uplink interference is likely being caused by one of the receiving base station's cells. In some implementations, OI may be used in conjunction with HII to notify a base station when the interference levels dictated by the base station's HII parameters are not being met, such that the uplink interference levels of a cell of another base station have exceeded a threshold. An illustrative case would be where a small cell is operating on the same frequency resources as cell-centric macrocell UEs, and one or more macrocell UEs are causing excessive uplink interference to the small cell. The small cell can report this interference to the macrocell using the OI parameters, and the macrocell might change the boundary between its cell-centric and its cell-edge regions. Another illustrative example is the case where a small cell makes lower power UL transmission assignments to UEs on the frequency resources that a macrocell has allocated for its cell-centric UEs, and these small cell UEs are causing excessive uplink interference for the macrocell. The macrocell base station may send OI parameters to the small cell, and the small cell may reduce the transmission power of UEs transmitting on these frequency resources.

These current mechanisms for base stations to exchange uplink interference information, comprised of identifying and reporting sub-carriers with excessive interference over a time period, are not effective for reporting and resolving uplink interference in the scenario illustrated in FIG. 1. Specifically, in the illustrated scenario, there is a need to identify a macrocell UE that is causing interference to a small cell. A macrocell UE may be assigned different uplink sub-carriers for each transmission, depending on the radio conditions at the time of assignment. Thus, identifying the sub-carriers on which the interference occurs does not help to identify the interfering UE. In addition, the small cell uplink interference caused by a macrocell UE may not meet the criteria for triggering an OI report, but may still cause significant interference to the small cell. What is needed is a novel uplink interference indicator that may be exchanged between base stations.

SUMMARY

Accordingly, systems and methods are disclosed for mitigating uplink interference with a small cell caused by a UE being served by a macrocell. Specifically, in an embodiment, systems and methods are disclosed for identifying macrocell user device(s) that are causing uplink interference to small-cell user devices when there is an uplink-downlink imbalance in the coverage of the small cell that causes a situation in which the macrocell user device(s) are unable to detect and report the downlink of the small cell, and, as a result, the macrocell is not able to identify the interfering macrocell UE(s) from small-cell downlink reports.

In an embodiment, a method for identifying an interfering macrocell user device is disclosed. The method comprises, by a first base station of a cellular network: receiving an interference indication message from a second base station, the interference indication message comprising an indication that the second base station is experiencing uplink interference from at least one interfering user device; receiving the configuration of the second base station's Physical Random Access Channel (PRACH), which includes the frequency resources allocated to the PRACH and the time slots that UEs may transmit preambles to the small cell; receiving a list of preambles from the second base station and associated time slots for the transmission of preambles by macrocell UEs; for each of a plurality, or a subset, of user devices being served by the first base station, assigning a received preamble and transmission time slot to the user device, transmitting the assigned preamble to the user device, and ordering each user device to transmit the assigned preamble on the resources used by the second base station's PRACH; receiving a list of preambles from the second base station, wherein the list of preambles comprises one or more preambles which were received at the second base station from a macrocell user device; and identifying the at least one interfering user device based on the list of preambles.

In an additional embodiment, a system for identifying an interfering macrocell user device is disclosed. The system comprises a first base station configured to: receive an interference indication message from a second base station, the interference indication message comprising an indication that the second base station is experiencing uplink interference from at least one interfering user device; receive a list of preambles from the second base station and information about the second base station's Physical Random Access Channel (PRACH); for each of a plurality, or a subset, of user devices being served by the first base station, assign a received preamble to the user device, transmit the assigned preamble to the user device, and order each user device to transmit the assigned preamble on the resources used by the second base station's PRACH; receive a list of preambles from the second base station, wherein the list of preambles comprises one or more preambles which were received at the second base station from a macrocell user device; and identify the at least one interfering user device based on the list of preambles.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, the disclosed systems and methods provide a means for a macrocell and small cell to cooperate to identify interfering UE(s). At a high level, the macrocell initiates a transmission of information, such as a preamble, from one or more potentially interfering UEs to the small cell, for instance, on the uplink control channel and/or uplink data channel of the small cell. The results of these transmissions can then be relayed to the macrocell by the small cell, and used by the macrocell to identify the interfering UE(s). It should be understood that, although the systems and methods will be described herein with reference to a macrocell and small cell, the disclosed systems and methods are applicable to any pair of overlapping cells in which one or more of the cells has unbalanced uplink and downlink coverage areas (e.g., combinations of macrocell and macrocell, as well as small cell and small cell). It should also be understood that these systems and methods are not limited to a pair of cells, but may be utilized with any number of overlapping cells (e.g., three or more).

Overview of Preamble Usage on PRACH in LTE

In mobile systems, such as LTE systems, a UE performs a physical non-synchronized random access (RA) procedure whenever it attempts to access a base station to which it is not synchronized. The UE may perform such a procedure when it powers on, transitions from an idle mode to a connected mode, is handed over between neighboring base stations, receives a Physical Downlink Control Channel (PDCCH) order from a base station, etc. In general, in an LTE system, whenever the UE is unsynchronized with an eNB, it may only access the eNB using the RA procedure.

The first step of the RA procedure is that a UE transmits a preamble on a Physical Random Access Channel (PRACH). The preamble is a sequence (e.g., a binary sequence) that is selected from a cell-specific set of sequences that are defined in the LTE physical layer specifications. Sequences of preambles are generally partitioned or allocated between neighboring cells so as to prevent the use of the same preamble by neighboring cells. Preambles are designed to facilitate detection even when a UE has not yet synchronized its uplink signal with the new base station. The preamble transmission allows the eNB to determine the propagation delay between the UE and the eNB. The eNB then provides the UE with a timing advance value which indicates at what time the UE should begin its uplink transmissions to compensate for the propagation delay. It should be understood that, while preambles will be discussed primarily herein in relation to LTE systems, other systems use preambles in an identical or similar manner. Accordingly, the disclosed systems and methods can be easily adapted to any such system by an individual having skill in the art.

Preambles may be used in a contention-less procedure (also known as a non-contention-based procedure) or a contention-based procedure. In a contention-less procedure, a UE is assigned a unique preamble by the base station being accessed. The assigned preamble is unique relative to other assigned preambles. Thus, the UE can use the unique preamble to access the base station without having to contend with other UEs utilizing the same preamble. In contrast, in a contention-based procedure, two UEs may utilize the same preamble. Thus, the procedure must be able to resolve conflicts caused by the use of the same preamble by two separate UEs. Such conflict resolution means are well-known in the art and will not be discussed in detail herein.

Preamble transmission on the PRACH is designed to raise the detection probability when the UE and eNB are not synchronized in the uplink channel and to facilitate the determination of the propagation delay. In LTE systems, PRACH time duration is generally one to three milliseconds. This time duration may include a guard time period to handle timing uncertainty and multiple formats for dealing with different amounts of delay, and a means for handling frequency offsets between a UE and eNB.

Identification of Interfering User Equipment

Figure 2:
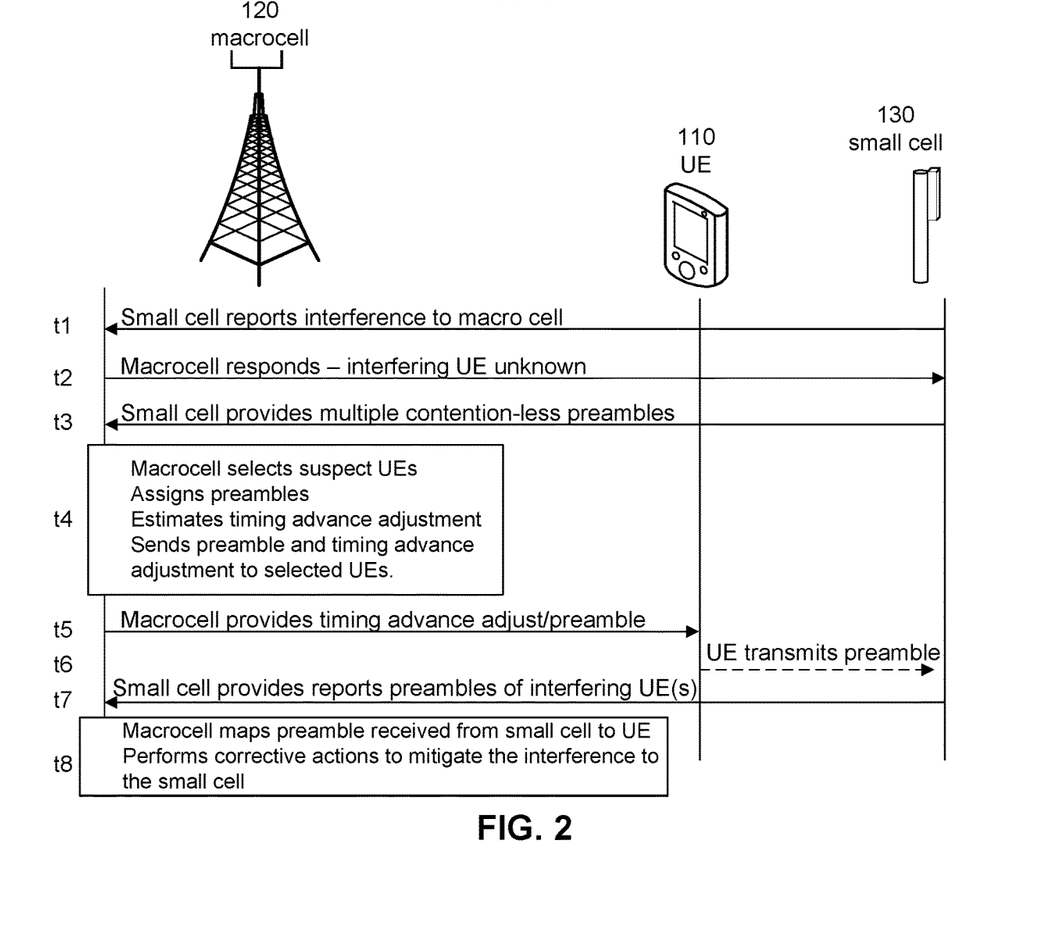
FIG. 2 illustrates the signaling for a method of identifying an interfering UE, according to an embodiment.

FIG. 2 is a diagram of the signaling for a process of identifying one or more interfering UEs, according to an embodiment. As discussed above, small cell 130 detects interference from one or more unidentified UEs on a radio carrier, which is being utilized, for instance, by both macrocell 120 and small cell 130. The small cell may be a femtocell, picocell, microcell, or other type of cell (including a macrocell) with an uplink coverage area 132 which overlaps a coverage area 122 of macrocell 120.

At time t1, the small cell 130 may notify the macrocell 120 concerning the interference. For example, this notification may be provided over a terrestrial connection between the two base stations of small cell 130 and macrocell 120. The X2 interface of the LTE standard is one such connection which may be utilized for such notifications, as well as other communications between macrocell 120 and small cell 130 discussed herein. However, it should be understood that alternative or additional methods of communication between macrocell 120 and small cell 130 are possible. The particular method of communication used between the macrocell 120 and small cell 130 is not critical to the disclosed embodiments, and suitable communication methods are well-known in the art. Accordingly, such methods will not be discussed in detail herein.

In an embodiment, the small cell base station provides the macrocell base station with an indication of uplink interference associated with a particular carrier. This interference indication may be sent as soon as possible after the interference has been detected. This interference indication might not be associated with particular sub-carriers of the carrier, and the interference indication might not include an indication of the interference power level. As but one example, the uplink interference indication may be—but is not restricted to be—comprised of a single bit of information for one carrier.

At time t2, the macrocell 120 may respond to small cell 130. The response may comprise a notification that the interfering UE(s) are unknown to macrocell 120. In an alternative embodiment, this response may be omitted.

At time t3, small cell 130 communicates access information to macrocell 120. This access information enables a UE to access small cell 130 on the uplink control channel and/or uplink data channel of small cell 130 (e.g., PRACH). In an embodiment, the access information comprises one or more preambles or an identification of one or more preambles (e.g., an index and/or algorithm or other data that the macrocell 120 may apply to determine the preambles itself). The access information may further identify radio resources used by small cell 130, such as PRACH configuration information, time slot information, sub-carrier information, frequency information, and the like.

In an embodiment which uses contention-less preambles, each of the multiple preambles can be unique relative to the other ones of the multiple preambles. The preambles may be determined by small cell 130 using known techniques, such as an algorithm or sequence. The number of preambles (e.g., 10, 25, 50, 100) communicated or identified to macrocell 120 may be a predetermined system setting or may be determined by macrocell 120 and/or small cell 130 (e.g., according to an algorithm). For instance, the response from macrocell 120 to small cell 130, sent at time t2, may comprise an identification of the number of preambles desired by macrocell 120.

At time t4, macrocell 120 may perform one or more actions for facilitating the identification of the interfering UE(s). For example, the macrocell may firstly attempt to narrow down the list of UEs being served by macrocell 120 to generate a list of one or more suspect UEs which are most likely interfering with small cell 130. In an embodiment, macrocell 120 may select only those UEs meeting one or more criteria (e.g., a location) indicative of a UE potentially interfering with small cell 130. As an illustrative example, the macrocell's selection of likely interfering macrocell UEs may be based on stored information that the macrocell base station 120 has collected from reports from served UEs, as well as information received from other base stations near macrocell 120, including small cell 130. For instance, neighbor cell information may be reported by neighboring base stations, including small cell 130, when the connections between the macrocell base station 120 and the other base stations are established. Macrocell 120 may also use stored geometry information that was collected in the past from macrocell UEs that detected and provided measurements for small cell 130. This information may be correlated with information known about a potentially interfering macrocell UE, such as measurements reports received from this macrocell UE for cells it was able to detect, the timing advance being used with the macrocell, and/or interference reports received from other base stations. Macrocell 120 may be configured to select a predetermined maximum number of suspect UEs, which may be equivalent to the number of preambles received from small cell 130. Alternatively, the macrocell 120 may treat every UE being served by the macrocell 120 as a suspect UE (i.e., potentially interfering UE). However, eliminating some of the served UEs from consideration can reduce overhead and increase efficiency.

In an embodiment, macrocell 120 assigns or maps the preambles to the list of suspect UEs identified by macrocell 120. Macrocell 120 may store this mapping in memory using a database, table, array, or other data structure. In this manner, macrocell 120 may subsequently determine which UE corresponds to a particular preamble by performing a lookup using an identification of the preamble.

In an embodiment, macrocell 120 also estimates a timing advance or timing advance adjustment for each UE in the list of suspect UEs. This estimation process is described in further detail below with reference to FIGS. 3 and 4.

At time t5, macrocell 120 transmits, to each of the UEs in the list of suspect UEs, the preamble assigned to the UE. In the same message or in a different message, macrocell 120 may also transmit, to each of the UEs in the list of suspect UEs, the timing advance information estimated for the UE. Also in the same message or in a different message, macrocell 120 may transmit additional information to each of the suspect UEs, such as additional access information received from small cell 130. Thus, each UE in the list of suspect UEs will receive a preamble and, in some embodiments, timing advance information and/or access information. In embodiments which utilize contention-less preambles, each of these UEs will receive a preamble that is different than the preamble received by each of the other suspect UEs. As discussed above, an association between each UE and the preamble assigned to and received by the UE may be stored in an assignment mapping maintained by macrocell 120.

At time t6, which represents a PRACH transmission opportunity, each of the UEs which received a preamble from macrocell 120 transmits the preamble in an uplink signal. Different UEs may transmit at different PRACH transmission opportunities. In embodiments in which macrocell 120 provides access information to the suspect UEs, each UE may transmit the preamble on a control channel or data channel of small cell 130 specified in and/or according to the access information. For example, the UEs may transmit their respective preambles on the PRACH of small cell 130. In addition, the UEs may transmit their respective preambles according to their respective timing advance information, as estimated by and received from macrocell 120.

Small cell 130 will have received the preamble from each of the UEs which successfully accessed the small cell 130, including one or more interfering UEs. Accordingly, at time t7, small cell 130 may transmit the preamble(s) received from the macrocell UE(s) to macrocell 120. At time t8, macrocell 120 performs a lookup on the stored mapping between UEs and preambles, based on the preamble(s) received at time t7 from small cell 130. Consequently, the mapping will return an identification of the interfering UE(s) associated with the received preamble(s).

In an embodiment, even if small cell 130 is able to receive a preamble from a UE that it is not serving, it is not automatically assumed that the UE is an interfering UE. Rather, at time t7 or at a prior or subsequent time, small cell 130 may transmit, in addition to the received preamble(s), the signal strength of each UE for which a preamble(s) was received to macrocell 120. In other words, for each received preamble, small cell 130 transmits an identification of the preamble and the signal strength with which the preamble transmission was received. Thus, macrocell 120 receives a set of preambles and associated signal strengths. Macrocell 120 can then sort or otherwise compare the received signal strengths to determine which UE(s) are most likely to be interfering with small cell 130. In an embodiment, it is assumed the UE(s) with the highest signal strengths are most likely to be the interfering UE(s). Accordingly, macrocell 120 may perform a lookup on the stored mapping to identify the interfering UE(s), based on the preambles corresponding to the highest signal strength(s). For example, if small cell 130 notifies macrocell 120 that three UEs are currently creating interference on an uplink channel, macrocell 120 may determine that the three UEs with the highest signal strength at small cell 130 are the interfering UEs. In another embodiment, macrocell 120 may estimate the signal strength of the data channel transmission from a macrocell UE that small cell 130 would receive based on the signal strength of the preamble received from small cell 130. Macrocell 120 can then determine the interfering UEs based on the data transmission signal strength measurement.

Once macrocell 120 has identified the interfering UE(s), macrocell 120 may choose and perform one or more corrective actions to mitigate the interference to small cell 130. For example, the corrective action may comprise handing over the interfering UE(s) to be served by small cell 130. As another example, the corrective action may comprise handing over the interfering UE(s) to a different radio carrier being operated by macrocell 120. Such handover techniques are well-known in the art, and therefore, will not be described in detail herein.

Estimation of Timing Advance

For uplink transmissions in mobile communications systems, such as LTE, a UE must compensate for transmission or propagation delay between the UE and the base station with which the UE is attempting to communicate. Otherwise, transmissions from the UE will not arrive at the base station at the proper time, i.e., the time at which the base station is expecting to receive, and thus looking for, a transmission. Consequently, a UE must know the transmission delay between the UE and the base station with which it is communicating. This timing compensation is called the "timing advance," and determining the uplink timing advance is called "synchronization."

Typically, when a UE accesses a new base station, the UE first synchronizes with a base station's downlink channel using downlink control signals, and then transmits a preamble to the new base station. However, since the transmission delay from the UE to the base station is not yet known, when the UE first transmits a preamble to a new base station on the uplink channel, the UE has not yet synchronized with the uplink channel of the base station. Thus, the preamble transmission includes a gap to allow for timing uncertainty. Once the base station receives the transmission from the UE, the base station is able to detect the preamble and determine the necessary timing advance for the UE. The base station then transmits the timing advance to the UE using over-the-air signaling. Accordingly, the UE is informed of the timing advance by the base station.

However, in the scenario illustrated in FIG. 1, when macrocell UE 110 attempts to access small cell 130, this conventional synchronization process between macrocell UE 110 and small cell 130 is not possible. Specifically, UE 110 is not within the downlink coverage area 134 of small cell 130. Thus, UE 110 does not have the opportunity to synchronize with the downlink channel of small cell 130, and has no beginning reference point by which to send the uplink transmission. Consequently, UE 110 does not know the timing advance required for an uplink transmission to small cell 130.

Figure 3:
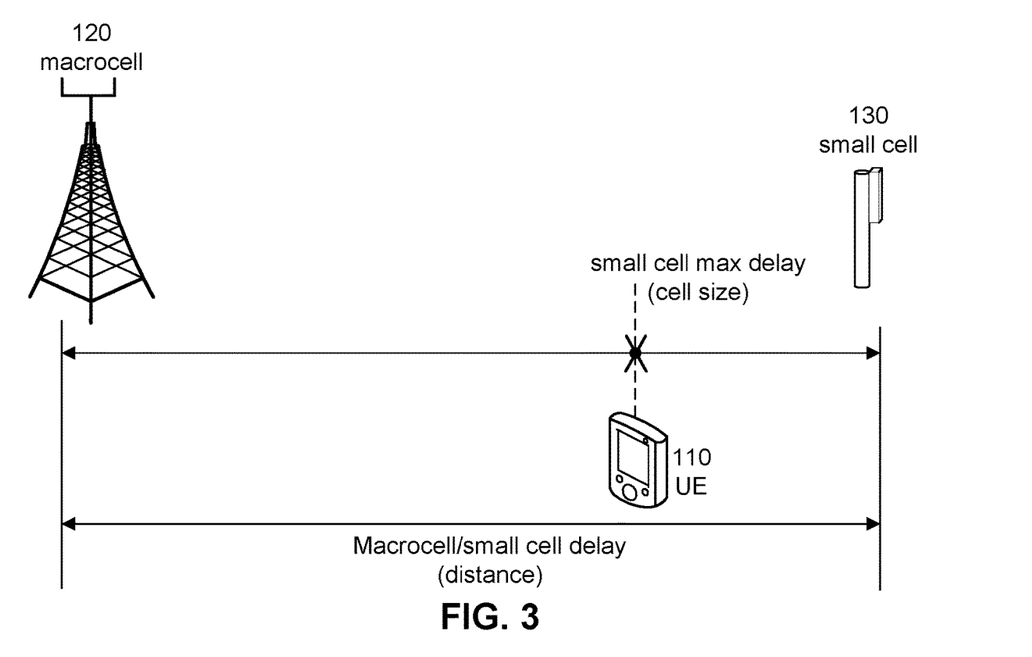
FIG. 3 illustrates a difference in timing advances for a UE with respect to a macrocell and small cell.

UE 110 only has the timing advance required for macrocell 120, which is different than the timing advance required for small cell 130 because of the difference in the propagation delays. FIG. 3 illustrates the difference in the timing advances required for macrocell 120 and small cell 130. In a simple embodiment, macrocell 120 could assume that the timing advance required between UE 110 and small cell 130 is the same as between UE 110 and macrocell 120. However, as shown, the timing advance is generally proportional to distance. Thus, unless UE 110 is equidistant to macrocell 120 and small cell 130, the required timing advances will likely differ.

Figure 5:
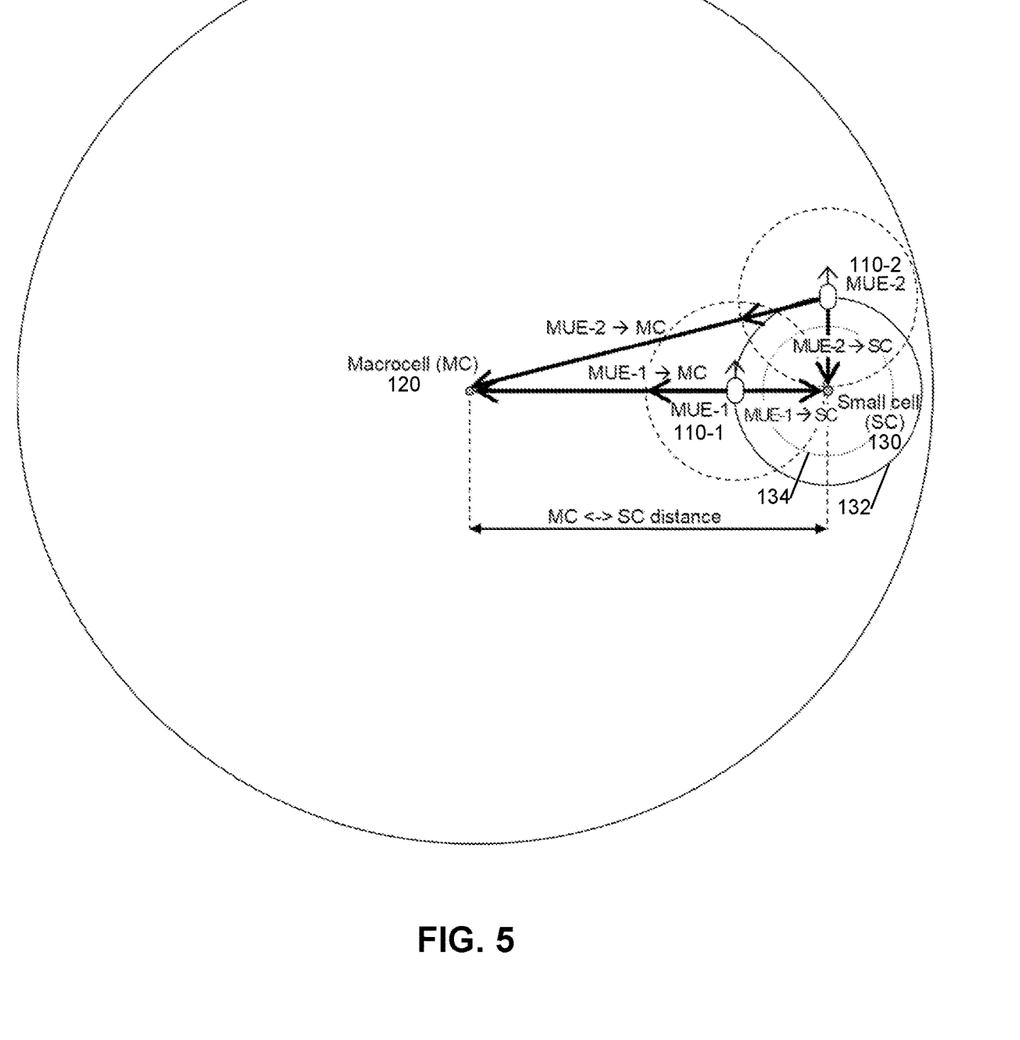
FIG. 5 illustrates relationships between a macrocell, small cell, and UEs in a described scenario.
Figure 6:
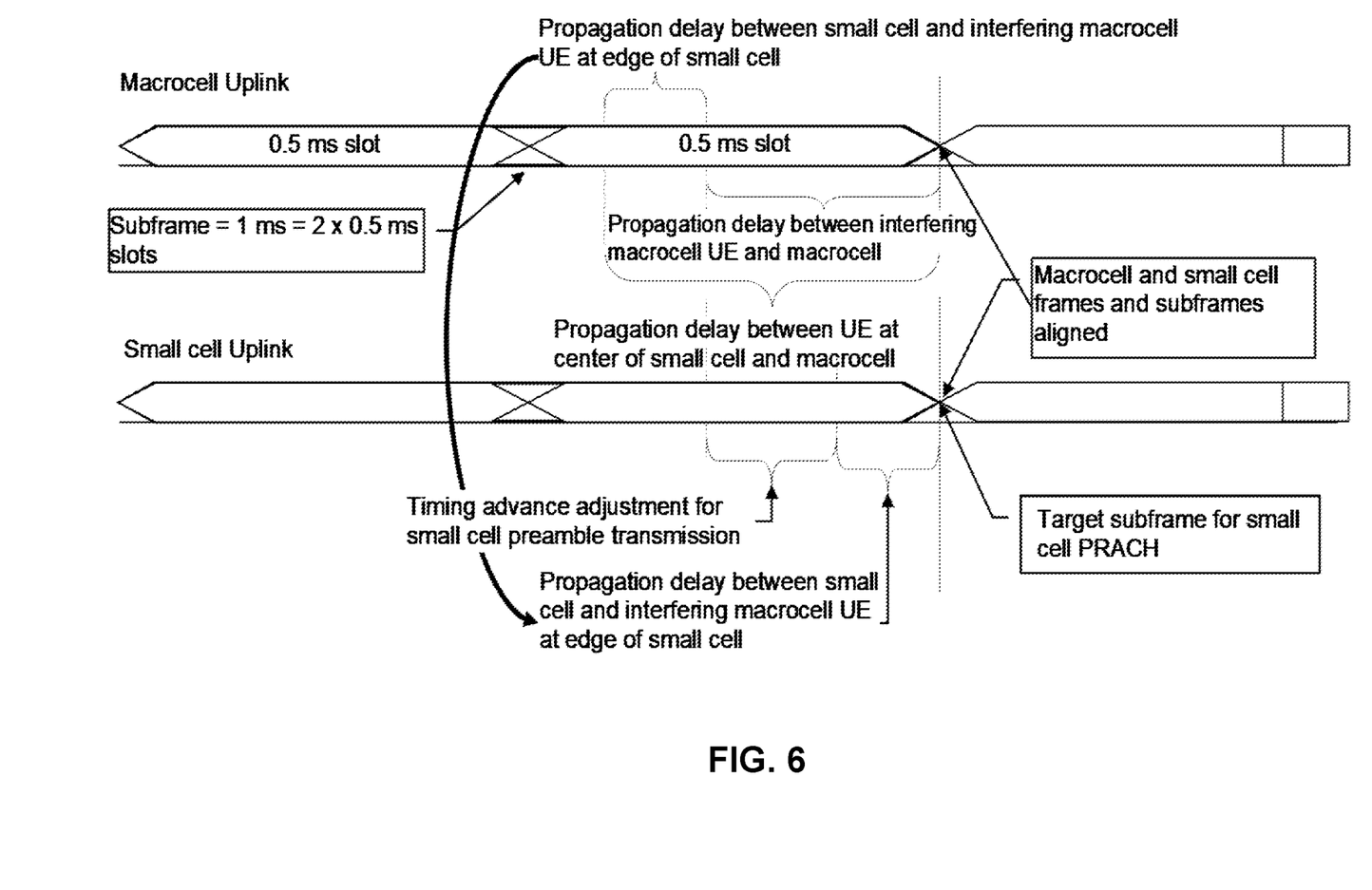
FIG. 6 illustrates example sub-frames of a macrocell and small cell uplink with example propagation delays, according to an embodiment.

In addition, macrocell UE 110 is most likely closer to small cell 130 than to macrocell 120, as illustrated in FIG. 5. Consequently, the macrocell timing advance that macrocell UE 110 is using is likely greater than the propagation delay between macrocell UE 110 and small cell 130, as can be seen in FIG. 6. Thus, macrocell UE 110 transmissions based on the macrocell timing advance would arrive before the start of the intended small-cell PRACH sub-frame. This makes preamble detection more difficult since the RA procedure is designed to detect preamble transmissions that are delayed from the intended sub-frame (i.e., received after the start of the intended sub-frame, rather than before the intended sub-frame). In an embodiment, macrocell 120 sets the timing advance of macrocell UE 110 to zero before it transmits the preamble. In this case, when the macrocell's and small cell's frames and sub-frames are synchronized, the macrocell's preamble transmission will be received by small cell 130 after the start of the intended sub-frame.

In an embodiment, macrocell 120 estimates a timing advance (e.g., at time t4 in FIG. 2) for communication between UE 110 and small cell 130. In order to perform this estimation, macrocell 120 may obtain location information for small cell 130. For example, macrocell 120 may receive the location of small cell 130 from small cell 130 (e.g., via a X2 interface in a LTE system). Alternatively, the location of small cell 130 may be received from an Operations and Maintenance (OAM) system and stored in a memory of macrocell 120. Based on the location information of small cell 130, macrocell 120 calculates the distance between itself and small cell 130. Alternatively, the distance between macrocell 120 and small cell 130 may be received from an OAM system and stored in a memory of macrocell 120, in which case no distance calculation is required. Macrocell 120 can then translate the distance between macrocell 120 and small cell 130 into an estimate of a transmission delay or propagation delay between macrocell 120 and small cell 130. For example, the distance may be converted to a propagation delay using a table or algorithm. In an embodiment, macrocell 120 assumes that a potentially interfering UE (e.g., UE 110) is near the edge of the coverage area of small cell 130. A timing advance suitable for the macrocell UE's preamble transmission to small cell 130 can be determined based on the distance between the cells and the timing advance being used between the macrocell UE and macrocell 120. For instance, if the macrocell's and small cell's frames and sub-frames are synchronized and macrocell 120, the macrocell UE, and small cell 130 are spatially aligned with each other, macrocell 120 can determine the timing advance by subtracting the propagation time associated with the distance between the cells and the current timing advance. The propagation time is determined by multiplying the distance between the cells by the speed of light. Since it is assumed that the macrocell UE is located at the edge of the coverage area of small cell 130, this timing advance value represents the maximum coverage radius of small cell 130, as illustrated in FIG. 5. In LTE systems, an absolute timing advance value is provided to the UE when the UE makes an initial access of a new cell. Subsequently, timing advance adjustments may be provided to the UE. The timing advance adjustment can be found by subtracting the propagation time associated with the distance between the cells and the current timing advance, and then subtracting this value from the current timing advance being used by the UE.

Similarly, macrocell 120 may obtain the maximum cell size of small cell 130. For example, macrocell 120 may receive the maximum cell size of small cell 130 from small cell 130 (e.g., via a X2 interface in a LTE system). Alternatively, the maximum cell size of small cell 130 may be received from an OAM system and stored in a memory of macrocell 120. In an embodiment, macrocell 120 assumes that a potentially interfering UE (e.g., UE 110) is near the edge of the coverage area of small cell 130. A timing advance suitable for the macrocell UE's preamble transmission to small cell 130 can be determined based on the maximum size of small cell 130 and the timing advance being used between the macrocell UE and macrocell 120. For instance, if the macrocell's and small cell's frames and sub-frames are synchronized and macrocell 120, the macrocell UE, and small cell 130 are spatially aligned with each other, macrocell 120 can use the small cell's maximum cell radius as the new timing advance value. The timing advance adjustment value can be obtained by subtracting the small cell's maximum cell radius from the macrocell UE's current timing advance. For the case in which the macrocell's and small cell's frames and sub-frames are not synchronized, the base stations may determine the difference in their timing by exchanging synchronization information or by information received from an OAM system. The timing advance estimation for the macrocell UE's preamble transmission may then be adjusted to compensate for this determined timing difference. Of course, the UE may be anywhere around the edge of small cell 130. Thus, in additional or alternative embodiments, UE may utilize conventional techniques for determining a more accurate location of a UE relative to small cell 130 (e.g., Global Position System (GPS) information, triangulation).

Using the estimate of the location of small cell 130 and the location of a potentially interfering UE and an estimate of the location of the UE relative to macrocell 120, macrocell 120 can estimate the timing advance or timing advance adjustment required for communication between the UE and small cell 130.

Figure 4:
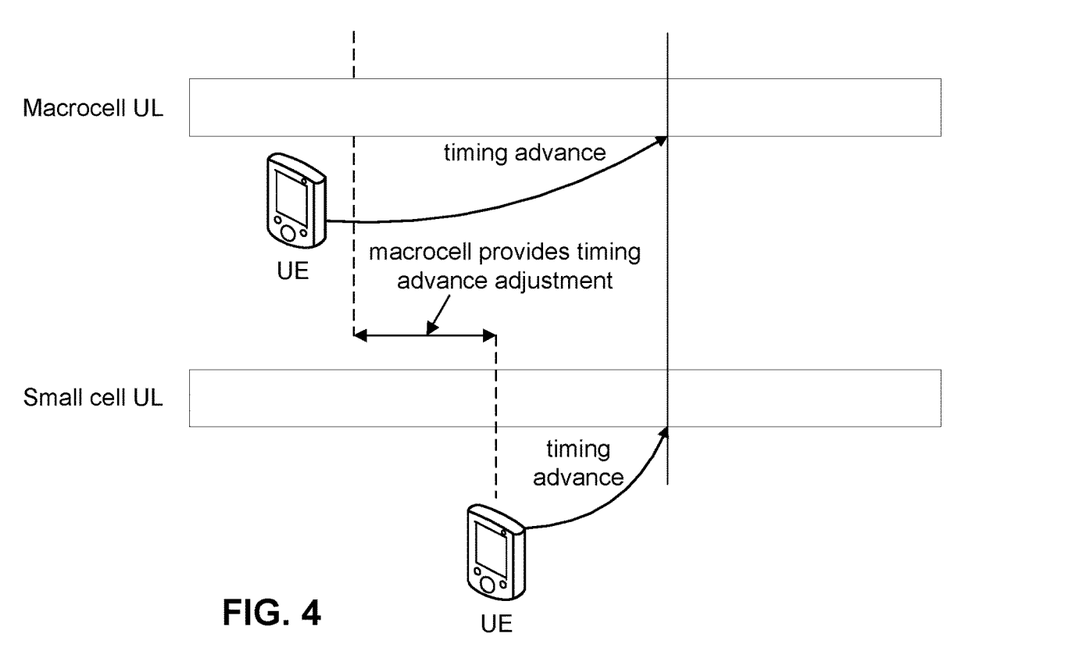
FIG. 4 illustrates a timing advance adjustment, according to an embodiment.

For instance, as illustrated in FIGS. 4-6, the timing advance required between UE 110 and macrocell 120 is generally greater than the timing advance required between UE 110 and small cell 130. This will generally be the case when UE 110 is closer to small cell 130 than to macro cell 120, as depicted in FIG. 3. Once macrocell 120 calculates an estimated timing advance or timing advance adjustment, this timing advance information can be transmitted to the potentially interfering UE for which it was calculated (e.g., at time t5 in FIG. 2). It should be understood that the timing advance information may comprise either the timing advance required for the UE to transmit to small cell 130, or a timing advance adjustment which can be applied to the timing advance required for the UE to transmit to macrocell 120 to obtain the timing advance required for the UE to transmit to small cell 130. For example, as shown in FIG. 4, the timing advance for transmission between the UE and small cell 130 is shorter than the timing advance for transmission between the UE and macrocell 120. Accordingly, in this case a timing advance adjustment would comprise a value that can be subtracted from the timing advance for transmission between the UE and macrocell 120 to obtain the timing advance for transmission between the UE and small cell 130.

EXAMPLE DEVICES

Figure 7:
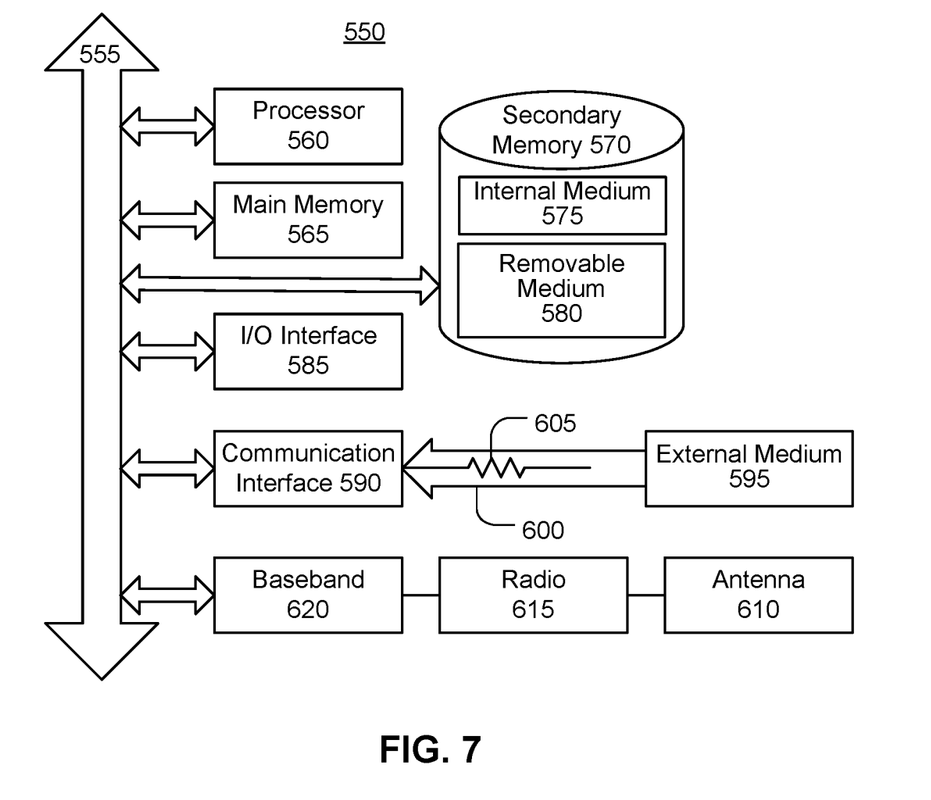
FIG. 7 illustrates an example device that may be used in connection with various embodiments described herein.

FIG. 7 is a block diagram illustrating an example wired or wireless system 550 that may be used in connection with various embodiments described herein. For example the system 550 may be used as, or in conjunction with, a UE, such as UE 110, and/or a base station, such as macrocell 120 and/or small cell 130. The system 550 can be a conventional personal computer, computer server, personal digital assistant, smart phone, tablet computer, vehicle navigation and/or control system, base station controller, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560, such as the overlay module and/or handwriting recognition module discussed above. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry-promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer-readable medium" is used to refer to any non-transitory computer-readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer-readable mediums are means for providing executable code, programming instructions, and software to the system 550.

In an embodiment that is implemented using software, the software may be stored on a computer-readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 and/or 570 may include various software modules (not shown) that were previously described with respect to FIGS. 2 and 3.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent certain embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method comprising:
   determining a first timing advance for uplink signal transmission timing from a user terminal to a first base station; and
   transmitting a second timing advance to the user terminal, the second timing advance determined, not based on a preamble received from the user terminal, to be the same as the first timing advance, the second timing advance for determining, by the user terminal, timing for transmitting an uplink signal to a second base station.

2. The method of claim 1, wherein the transmitting is done before a change of a serving base station of the user terminal from the first base station to the second base station is completed.

3. The method of claim 1, further comprising transmitting, from the first base station to the user terminal, resource information to be used by the user terminal for transmitting the uplink signal to the second base station.

4. A first base station comprising:
a processor configured to determine a first timing advance; and
a transmitter configured to transmit a second timing advance to a user terminal, the second timing advance determined, not based on a preamble received from the user terminal, to be the same as the first timing advance, the first timing advance for determining, by the user terminal, timing for uplink signal transmission to the first base station, the second timing advance for determining, by the user terminal, timing to transmit an uplink signal to a second base station.

5. A user terminal comprising:
a receiver configured to receive a first timing advance from a first base station where the first timing advance has been determined, not based on a preamble received from the user terminal, to be the same as a second timing advance, the second timing advance for determining, by the user terminal, timing for uplink signal transmission to the first base station, the first timing advance for determining, by the user terminal, timing to transmit an uplink signal to the second base station; and
a transmitter configured to transmit, to the second base station, the uplink signal with a timing adjusted by the first timing advance.

6. An apparatus for controlling a user terminal, the apparatus comprising a processor and a memory, the processor configured to:
receive a first timing advance from a first base station where the first timing advance has been determined, not based on a preamble received from the user terminal, to be the same as a second timing advance, the second timing advance for determining, by the user terminal, timing for uplink signal transmission to the first base station, the first timing advance for determining, by the user terminal, timing to transmit an uplink signal to a second base station; and
transmit, to the second base station, the uplink signal with a timing adjusted by the first timing advance.

7. A base station comprising:
a receiver configured to receive, from a user terminal, an uplink signal at a timing adjusted by the user terminal based on a first timing advance received at the user terminal from another base station, the first timing advance determined, not based on a preamble received from the user terminal, to be the same as a second timing advance determined by the another base station, the second timing advance for determining, by the user terminal, timing for uplink signal transmission to the another base station, the first timing advance for determining, by the user terminal, timing to transmit the uplink signal to the base station.

* * * * *